(12) United States Patent
Ma et al.

(10) Patent No.: US 11,990,044 B2
(45) Date of Patent: May 21, 2024

(54) INTELLIGENT COLLISION AVOIDANCE METHOD FOR A SWARM OF UNMANNED SURFACE VEHICLES BASED ON DEEP REINFORCEMENT LEARNING

(71) Applicant: Wuhan University of Technology, Wuhan (CN)

(72) Inventors: Yong Ma, Wuhan (CN); Yujiao Zhao, Wuhan (CN); Yulong Wang, Wuhan (CN)

(73) Assignee: WUHAN UNIVERSITY OF TECHNOLOGY, Wuhan (CN)

( * ) Notice: Subject to any disclaimer, the term of this patent is extended or adjusted under 35 U.S.C. 154(b) by 336 days.

(21) Appl. No.: 17/292,601

(22) PCT Filed: Sep. 30, 2020

(86) PCT No.: PCT/CN2020/119188
§ 371 (c)(1),
(2) Date: Mar. 3, 2022

(87) PCT Pub. No.: WO2021/082864
PCT Pub. Date: May 6, 2021

(65) Prior Publication Data
US 2022/0189312 A1    Jun. 16, 2022

(30) Foreign Application Priority Data
Oct. 30, 2019  (CN) .......................... 201911043840.5

(51) Int. Cl.
*G05D 1/00*    (2024.01)
*G06N 3/08*    (2023.01)
*G08G 3/02*    (2006.01)

(52) U.S. Cl.
CPC .............. *G08G 3/02* (2013.01); *G05D 1/0088* (2013.01); *G05D 1/0206* (2013.01); *G06N 3/08* (2013.01)

(58) Field of Classification Search
CPC ...... G08G 3/02; G05D 1/0088; G05D 1/0206; G06N 3/08
See application file for complete search history.

(56) References Cited

U.S. PATENT DOCUMENTS

| 10,279,474 B2 * | 5/2019 | Mühlig ................ B25J 9/163 |
| 2017/0229029 A1 * | 8/2017 | Klinger ................ G01S 13/02 |
| 2018/0267562 A1 * | 9/2018 | MacCready ......... G08G 5/0008 |

FOREIGN PATENT DOCUMENTS

| CN | 108710372 A | * 10/2018 |
| CN | 108820157 A | * 11/2018 |

(Continued)

OTHER PUBLICATIONS

Singh. "Cooperative Swarm Optimisation of Unmanned Surface Vehicles," http://dx.doi.org/10.24382/1174 University of Plymouth, Jan. 2019 (Year: 2019).*

(Continued)

*Primary Examiner* — Ladimir Magloire
*Assistant Examiner* — Samarina Makhdoom
(74) *Attorney, Agent, or Firm* — WPAT, P.C

(57) ABSTRACT

Disclosed is an intelligent collision avoidance method for a swarm of unmanned surface vehicles based on deep reinforcement learning; firstly, a theoretical framework of autonomous learning collision avoidance of a swarm of unmanned surface vehicles based on deep reinforcement learning is proposed, and the LSTM neural network memory ability is integrated to realize the continuity of collision avoidance actions; then, according to the USV environment in the framework, the characterization method is obtained, and the USV collision avoidance reward and punishment (Continued)

function is proposed to evaluate the collision avoidance effect; finally, an intelligent collision avoidance training system for a swarm of unmanned surface vehicles is formed. The simulation and verification of this disclosure show that the USV trained in this disclosure can navigate safely in the collision avoidance environment with a swarm of unmanned surface vehicles and realize intelligent collision avoidance.

6 Claims, 7 Drawing Sheets

(56) References Cited

FOREIGN PATENT DOCUMENTS

| CN | 109540136 A | * | 3/2019 |
| CN | 109540151 A | * | 3/2019 |
| CN | 110196605 A | * | 9/2019 |

OTHER PUBLICATIONS

Huang et al. "Cooperative Multi-UAV Collision Avoidance Based on a Complex Network," Appl. Sci. 2019, 9, 3943; doi: 10.3390/app9193943 Sep. 20, 2019 (Year: 2019).*

Ray. "Collision-Free Swarm Motion Planning with Control Barrier Functions," Brown University, May 15, 2019 (Year: 2019).*

* cited by examiner

INTELLIGENT COLLISION AVOIDANCE METHOD FOR A SWARM OF UNMANNED SURFACE VEHICLES BASED ON DEEP REINFORCEMENT LEARNING

FIELD OF THE DISCLOSURE

The disclosure relates to an intelligent collision avoidance method for a swarm of unmanned surface vehicles based on deep reinforcement learning.

BACKGROUND

With the development of new technologies in the shipbuilding industry, artificial intelligence and other fields, unmanned surface vehicles have played an important role in marine development, maritime management and other fields. In some complex application scenarios, a single unmanned surface vehicle cannot complete a task, and a swam of unmanned surface vehicles are required to work together, that is, the swarm of unmanned surface vehicles work together to complete the task. Collision avoidance of a swarm of unmanned surface vehicles requires safe avoidance between unmanned surface vehicles. If adopting the existing collision avoidance method for unmanned surface vehicles, it will cause a huge amount of calculation and analysis, low calculation efficiency, and poor effect, making it difficult to achieve a rapid decision for collision avoidance. Therefore, it is urgent to design a new collision avoidance method suitable for a swarm of unmanned surface vehicles.

SUMMARY

The disclosure proposes an intelligent collision avoidance method for a swarm of unmanned surface vehicles based on deep reinforcement learning to solve the technical problems of huge calculation and analysis amount, low calculation efficiency, poor effect and difficulty in realizing rapid collision avoidance decision in the existing collision avoidance method for unmanned surface vehicles.

A collision avoidance method for a swarm of unmanned surface vehicles based on deep reinforcement learning, including:

S1: Establishing a vehicle coordinate system, and designing a USV motion model based on the vehicle coordinate system, wherein the USV motion model is used to reflect the motion state of the unmanned surface vehicle;

S2: Based on the USV motion model, the environmental features in the vehicle coordinate system are expressed as environmental observation values of a fixed dimension, and designing a reward and punishment function of collision avoidance effect based on the environmental observation values, wherein the reward and punishment function of collision avoidance effect is used to judge the perfection degree of a collision avoidance decision of unmanned surface vehicles;

wherein, based on the USV motion model, the environmental features in the vehicle coordinate system are expressed as environmental observation values of a fixed dimension, including:

according to the international maritime collision avoidance rule COLREGS, and based on the vehicle-side angle of obstacle $USV_j$, n fields are divided, and the USV environmental observation value of each field is obtained, wherein the USV environmental observation value of each field includes vehicle-side angle, swarm movement characteristics, movement trends and degree of danger;

combining the environmental observation value in each field to form a four-dimensional matrix, and adding weights to the corresponding four-dimensional matrix of each field to obtain a final environmental observation value;

obtaining the USV environmental observation value in each field through $$\begin{cases} \Delta\theta = \theta_{max} - \theta_{min} \\ \overline{C} = \dfrac{1}{n}\sum_{i=1}^{n} C_j \\ CRI' = \prod_{j=1}^{n} CRI_j \\ \overline{d} = \sum_{i=1}^{n} d_j/n \\ V_x = \sum_{j=1}^{n} V_{j\_x} \\ V_y = \sum_{j=1}^{n} V_{j\_y} \end{cases},$$

where $\theta_{max}$ and $\theta_{min}$ represent the maximum and minimum vehicle-side angles of obstacle in the field; $C_j$ represents the movement direction of obstacle; $CRI_j$ represents danger degree of $USV_j$; $d_j$ represents the distance between $USV_i$ and the obstacle $USV_j$, $V_{j\_x}$ and $V_{j\_y}$ respectively represent the x horizontal component and y vertical component of the velocity of the obstacle $USV_j$;

forming four-dimensional matrix u=(1, 2, ..., n) of each field from $S_u=[\Delta\theta\ \overline{C}\ CRI'\ \overline{d}\ V_x\ V_y]$, and obtaining the final environmental observation value from $s_t=[V_i\ C_i\ \chi_1 S_1\ \chi_2 S_2\ \chi_3 S_3\ \cdots\ \chi_n S_n]^T$, where $\chi_1, \chi_2, \chi_3, \ldots, \chi_n$ are the weights of the corresponding fields respectively;

designing the reward and punishment function by $$R_{danger} = \sum_{i=1}^{n} \ln\left(\frac{DCPA_i}{D_s}\right)^2 + k_{CRI} \times \sum_{u=1}^{4} CRI'_{t-1} - CRI'_t$$

$$R_{rule} = \exp\left(-\frac{a_t(V)}{D_{LMA}} \times \sum_{u=1}^{4} \sqrt{(\overline{d}_t - \overline{d}_{t-1})^2} - (V_0 - V_s)^2 + a_t(V)\right)$$

$$R_{action} = 1/1 + \exp(-k_{action}\delta_t \times (a_t(C) - a_{t-1}(C)))$$

$$r_t = R_{danger} + R_{rule} + R_{action},$$

where, $CRI'_t$ represents the danger degree of at time field t, $\overline{d}_t$ represents the average distance of obstacles at time field t, $a_t(C)$ represents the course change in the decision set, $a_t(V)$ represents the velocity change of the decision set, and $R_{danger}$ considers the reward and punishment calculations of encounter situation and represents the changing trend of the danger degree. $R_{rule}$ calculates the deviation between the current decision and the COLREGS rule, if the rule is violated, a punitive negative value will be obtained, $R_{action}$ represents the continuity of the decision-making action, and calculates the impact of decision-making shock in collision avoidance, $r_t$ represents the reward and punishment value formed by combining the above factors, $DCPA_i$ represents the minimum encounter distance between the own vehicle and the $USV_j$, $D_s$ represents the safe distance between the two vehicles to avoid collision, $k_{CRI}$ represents the impact coefficient of collision risk, $D_{LMA}$ represents the shortest distance between two ships to avoid collision when one ship implements full rudder rotation to avoid collision and the other ship is going straight, $V_0$ represents the initial velocity of the vehicle, $V_s$ represents the safe velocity of the vehicle calculated considering the influence of the velocity of the vehicle, the safety distance between vehicles and the navigation environment, $k_{action}$ represents coefficient of action influence, $\delta_r$ represents the rudder angle of the vehicle;

S3: Integrating LSTM neural network and deep reinforcement learning principles to build a collision avoidance training model for a swarm of unmanned surface vehicles;

S4: Training the USV to avoid collision in the environment with a swarm of unmanned surface vehicles based on the collision avoidance training model for a swarm of unmanned surface vehicles.

The beneficial effects of this disclosure include:

1) This disclosure can effectively solve the problem of intelligent collision avoidance of a swarm of unmanned surface vehicles, by training collision avoidance of a swarm of unmanned surface vehicles in a virtual environment, and save experience data, it can be applied to actual collision avoidance of a swarm of unmanned surface vehicles. The training method based on deep reinforcement learning theory can improve the adaptability of collision avoidance of a swarm of unmanned surface vehicles in different collision avoidance environments, and obtain the collision avoidance effect of "past and clear" for a swarm of unmanned surface vehicles.

2) Proposing a feature extraction method that represents the surrounding environment and encounter situation of USV, using a quantifiable calculation method to describe the dynamic collision avoidance environment, and using a fixed-dimensional matrix to represent it. At the same time, a reward and punishment function is designed to judge the collision avoidance effect of USV, which can judge the collision avoidance effect of USV in the current state and feed it back to the collision avoidance training model.

3) Using the memory ability of the LSTM neural network to realize the continuous action storage of the collision avoidance process of the unmanned surface vehicles, which can save the potential correlation of the experience data during the multiple training process, and learn the correlation between the collision avoidance actions at the same time to form a training experience pool for USV collision avoidance.

4) The principle of deep reinforcement learning enables the USV to interact with the training environment and learn collision avoidance actions, independently update the network parameters, and finally realize the safe avoidance of the USV in the swarm of unmanned surface vehicles collision avoidance environment.

5) Applying collision avoidance model for a swarm of unmanned surface vehicles to train in the designed training scenario, and the final trained collision avoidance model can guide the USV to avoid collisions in the environment with a swarm of unmanned surface vehicles, and the USV has certain adaptations to a variety of collision avoidance environments.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

Embodiment is provided below to further explain the method provided by this disclosure.

To solve the collision avoidance problem of a swarm of unmanned surface vehicles, this disclosure provides an intelligent collision avoidance training method for a swarm of unmanned surface vehicles based on deep reinforcement learning theory, which provides a collision avoidance method for a swarm of unmanned surface vehicles in the open water environment that complies with the International Regulations for Preventing Collisions at Sea (COLREGS). This method realizes the model training of collision avoidance for a swarm of unmanned surface vehicles, and can be used to guide the actual USVs to avoid collisions.

In order to make the above objectives, features, and advantages of the disclosure more obvious and understandable, the disclosure will be described in further detail below in conjunction with the drawings and specific implementations.

Figure 1:
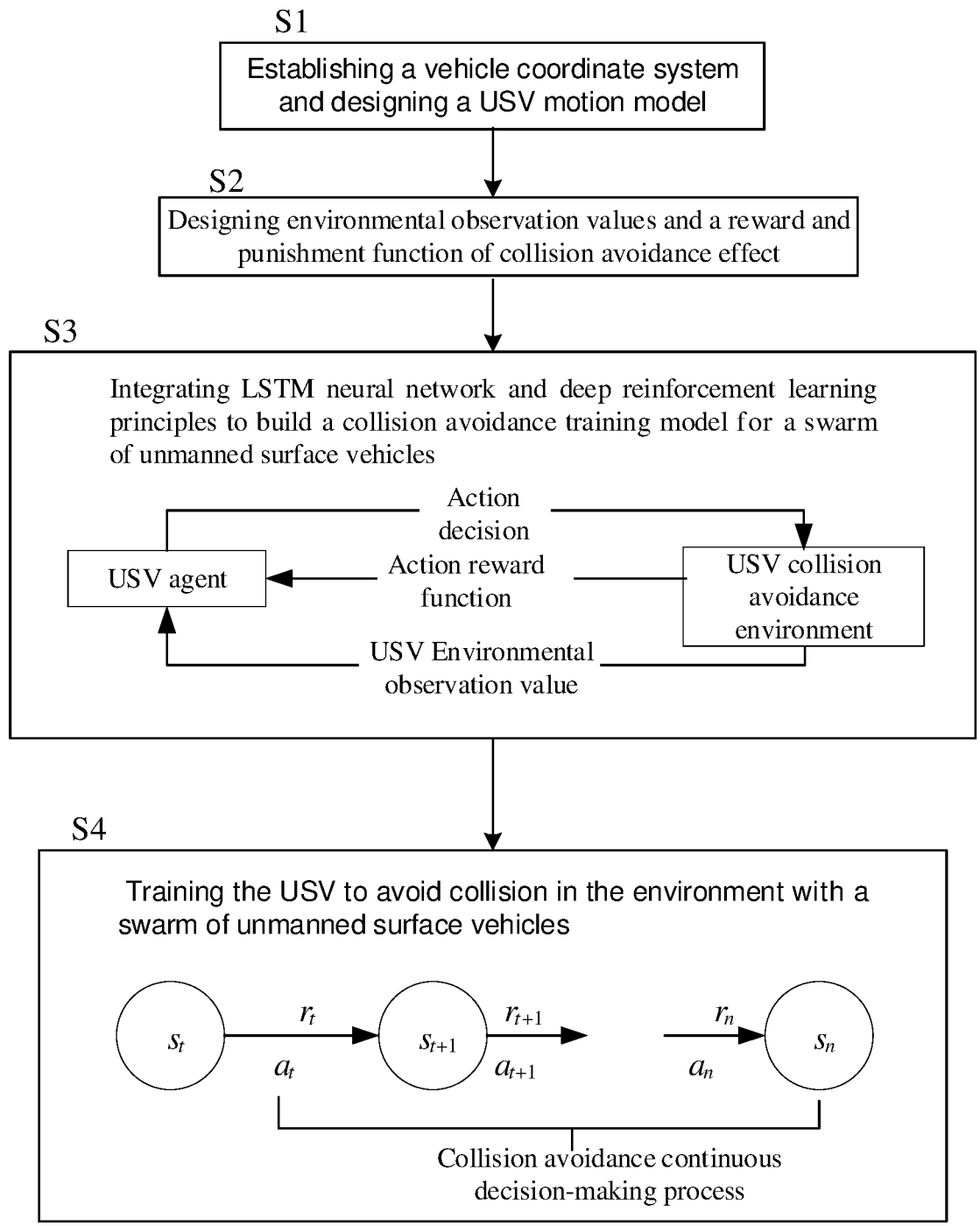
FIG. 1 is a schematic diagram of the construction and training process of an intelligent collision avoidance model for a swarm of unmanned surface vehicles provided by this disclosure.

FIG. 1 is a schematic diagram of the construction and training process of an intelligent collision avoidance model for a swarm of unmanned surface vehicles provided by this disclosure, the method described in FIG. 1 includes the following steps:

S1: Establishing a vehicle coordinate system, and designing a USV motion model.

Figure 2:
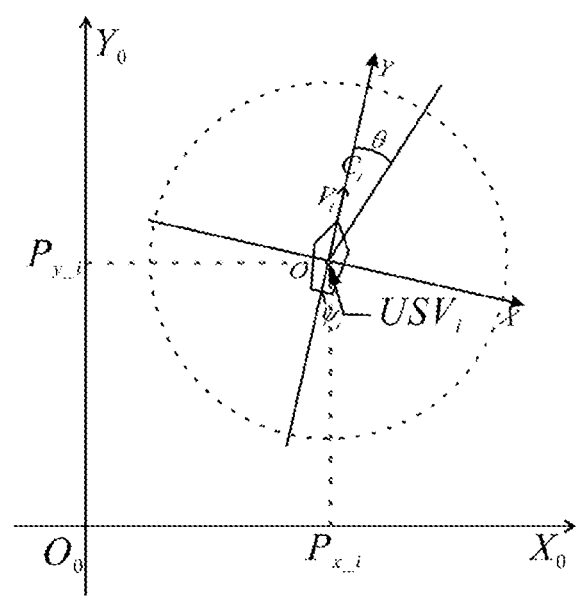
FIG. 2 is a model diagram of a vehicle coordinate system in a global coordinate system provided by this disclosure.

FIG. 2 shows the XOY model of the vehicle coordinate system under the global coordinate system $X_0O_0Y_0$. In the designed vehicle coordinate system, the Cartesian two-dimensional coordinate system and the polar coordinate system are merged to characterize the relative orientation and movement relationship of obstacles in the vehicle coordinate system. Among them, the motion attributes of $USV_i$ in the global coordinate system include: course $C_i$, velocity $V_i$, rudder angle $\delta_i$, and position $(P_{x\_i}, P_{y\_i})$, the motion attributes of $USV_j$ in the vehicle coordinate system are: course $c_j$, velocity $v_j$, vehicle-side angle $\theta_j$, rudder angle $\psi_j$, and location $(X_j, Y_j)$. In order to facilitate the conversion of the motion relationship between USVs, a conversion formula from the global to the vehicle coordinate system is designed. It is assumed that the surrounding unmanned surface vehicles are converted into the attribute representation form under the vehicle coordinate system for $USV_i$ by $$\begin{cases} [X_j \ Y_j] = [P_{x\_j} - P_{x\_i} \ P_{y\_j} - P_{y\_i}] \begin{bmatrix} \cos C_i & \sin C_i \\ \sin C_i & \cos C_i \end{bmatrix} \\ c_j = C_j - C_i \\ v_j = V_j - V_i \\ \psi_j = \delta_j \\ \theta_j = \arctan(Y_j/X_j) \end{cases}$$

where, $(P_{x\_j}, P_{y\_j})$ represents the position of $USV_j$ in the global coordinate system, $C_j$ represents the course of $USV_j$ in the global coordinate system, $V_j$ represents the velocity of $USV_j$ in the global coordinate system, and $\delta_j$ represents the rudder angle of $USV_j$ in the global coordinate system.

Designing USV motion model based on the vehicle coordinate system, using the Nomoto equation as the motion equation of the unmanned surface vehicles in the motion simulation, and embedding the PID to simulate the autonomous course control, so that the unmanned surface vehicle has the ability to quickly adjust the course by controlling the rudder angle.

$E_k = C_{target} - C_k$ $\Delta u(k) = (K_p + K_i*1/f + K_d*f)E_k - (K_p + 2K_d*f*E_{k-1} + K_d*f*E_{k-2})$ $\delta_k = \delta_{k-1} + \Delta u(k)$ where, k represents the action to execute the kth decision, $E_k$ represents the kth course deviation value, $C_{target}$ represents the target course, $C_k$ represents the kth course angle, $\delta_k$ and $\partial_{k-1}$ represent the rudder angles after the kth execution and k−1th execution respectively, $K_p$ represents the proportional coefficient, $K_i$ represents the integral coefficient, $K_d$ represents the differential coefficient, f represents the scanning frequency, $\Delta u(k)$ represents the kth rudder angle increment, $E_{k-1}$ represents the k−1th course angle, $E_{k-2}$ represents the k−2th course angle.

S2: designing environmental observation values and a reward and punishment function of collision avoidance effect The distance dj between the obstacle $USV_j$ and the unmanned surface vehicle $USV_i$, vehicle-side angle $\theta_j$, movement direction $c_j$, velocity $v_j$ and other variables will change with the changes in the encounter situation. At the same time, $USV_i$ will also make arbitrary collision avoidance action based on the current encounter situation, that is, there is a continuous action space. In order to represent the continuous action space of the USV, the environmental characteristics in the $USV_i$ vehicle coordinate system need to be expressed as a fixed-dimensional environmental observation value $s_t$, which directly determines the final velocity change and rudder angle manipulation.

Figure 3:
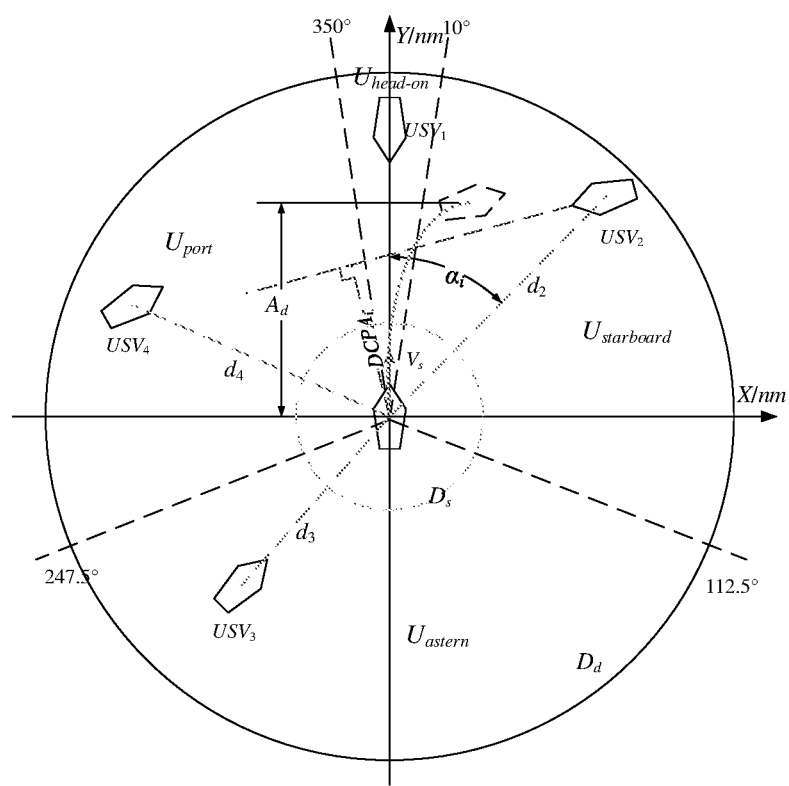
FIG. 3 is a design standard diagram for environmental observation values provided by the disclosure.

FIG. 3 shows the design standard diagram for USV environmental observation values. According to the International Regulations for Preventing Collisions at Sea (COLREGS), and based on the vehicle-side angle of obstacles USVj, 4 areas is divided, including: confrontation situation $U_{head-on} \in (350°, 360°] \cap (0°, 10°]$, cross encounter situation $U_{starboard} \in (10°, 112.5°]$ & $U_{port} \in (247.5°, 350°]$ and chase situation $U_{astern} \in (112.5°, 247.5°]$. The USV environmental information in each field includes the degree of danger $CRI_j$, the control advance distance $A_d$, $DCPA_j$, vehicle-side angle $\theta_j$, and the distance $d_j$, etc. The environmental characteristics will appear unpredictable with the collision avoidance action, so it is necessary to form the field environment observation value from the aspects of vehicle-side angle, swarm motion characteristics, movement trend, and degree of danger.

$$\begin{cases} \Delta\theta = \theta_{max} - \theta_{min} \\ \overline{C} = \frac{1}{n}\sum_{i=1}^{n} C_j \\ CRI' = \prod_{j=1}^{n} CRI_j \\ \overline{d} = \sum_{i=1}^{n} d_j/n \\ V_x = \sum_{j=1}^{n} V_{j\_x} \\ V_y = \sum_{j=1}^{n} V_{j\_y} \end{cases}$$

where $\theta_{max}$ and $\theta_{min}$ represent the maximum and minimum vehicle-side angles of obstacle in the field; $C_j$ represents the movement direction of obstacle; $CRI_j$ represents danger degree of $USV_j$; $d_j$ represents the distance between $USV_i$ and the obstacle $USV_j$, $V_{j\_x}$ and $V_{j\_y}$ respectively represent the x horizontal component and y vertical component of the velocity of the obstacle $USV_j$, n represent the number of divided areas, in this disclosure embodiment, corresponding to the above-mentioned area division method, n=4.

Forming four-dimensional matrix u=(1, 2, ..., n) of each field from $S_u = [\Delta\theta \ \overline{C} \ CRI' \ \overline{d} \ V_x \ V_y]$, and obtaining the final environmental observation value $s_t$ from $s_t = [V_i \ C_i \ \chi_1 S_1 \ \chi_2 S_2 \ \chi_3 S_3 \ \ldots \ \chi_n S_n]^T$, where $\chi_1, \chi_2, \chi_3, \ldots, \chi_n$ are the weights of the corresponding fields respectively.

During the collision avoidance process of the USV, in order to ensure that the USV does not collide with the obstacle, the distance between the USV and the obstacle needs to meet $d_i \geq 2L$, where L represents the length of the vehicle, and the following collision avoidance targets are set as the basis for judging the collision avoidance effect: (1) the average distance between the USV and the obstacle increases, that is $\overline{d}_t > \overline{d}_{t-1}$; (2) The risk of collision between the USV and the obstacle is reduced, that is $a_t(C) \approx a_{t-1}(C)$; (3) There is no significant sudden change in the collision avoidance action of the USV, that is $a_t(C) \approx a_{t-1}(C)$. On the basis of achieving the USV collision avoidance goal, in order to make the unmanned surface vehicle comply with the COLREGS rules, correcting the unmanned surface vehicle's collision avoidance actions that violate the rule. Based on the above analysis, designing a reward and punishment function to judge the perfection degree of the collision avoidance decision of unmanned surface vehicles:

$$R_{danger} = \sum_{i=1}^{n} \ln\left(\frac{DCPA_i}{D_s}\right)^2 + k_{CRI} \times \sum_{u=1}^{4} CRI'_{t-1} - CRI'_t$$

$$R_{rule} = \exp\left(-\frac{a_t(V)}{D_{LMA}} \times \sum_{u=1}^{4} \sqrt{(\overline{d}_t - \overline{d}_{t-1})^2} - (V_0 - V_s)^2 + a_t(V)\right)$$

-continued $$R_{action} = 1/1 + \exp(-k_{action}\delta_t \times (a_t(C) - a_{t-1}(C)))$$

$$r_t = R_{danger} + R_{rule} + R_{action}$$

where, $CRI'_t$ represents the danger degree of at time field t, $\bar{d}_t$ represents the average distance of obstacles at time field t, $a_t(C)$ represents the course change in the decision set, $a_t(V)$ represents the velocity change of the decision set, and $R_{danger}$ considers the reward and punishment calculations of encounter situation and represents the changing trend of the danger degree. $R_{rule}$ calculates the deviation between the current decision and the COLREGS rule, if the rule is violated, a punitive negative value will be obtained, $R_{action}$ represents the continuity of the decision-making action, and calculates the impact of decision-making shock in collision avoidance, $r_t$ represents the reward and punishment value formed by combining the above factors, $DCPA_i$ represents the minimum encounter distance between the own vehicle and the $USV_i$, $D_s$ represents the safe distance between the two vehicles to avoid collision, $k_{CRI}$ represents the impact coefficient of collision risk, $D_{LMA}$ represents the shortest distance between two ships to avoid collision when one ship implements full rudder rotation to avoid collision and the other ship is going straight, $V_0$ represents the initial velocity of the vehicle, $V_s$ represents the safe velocity of the vehicle calculated considering the influence of the velocity of the vehicle, the safety distance between vehicles and the navigation environment, $k_{action}$ represents coefficient of action influence, $\delta_t$ represents the rudder angle of the vehicle.

By designing the reward and punishment function, it is able to judge whether the current manipulation decision is beneficial to the collision avoidance of unmanned surface vehicles. At the same time, consider the constraints of the collision avoidance rules of a swarm of unmanned surface vehicles in the reward and punishment function, so as to guide the unmanned surface vehicle in the next collision avoidance action to choose collision avoidance actions that are more in line with expectations.

Figure 4:
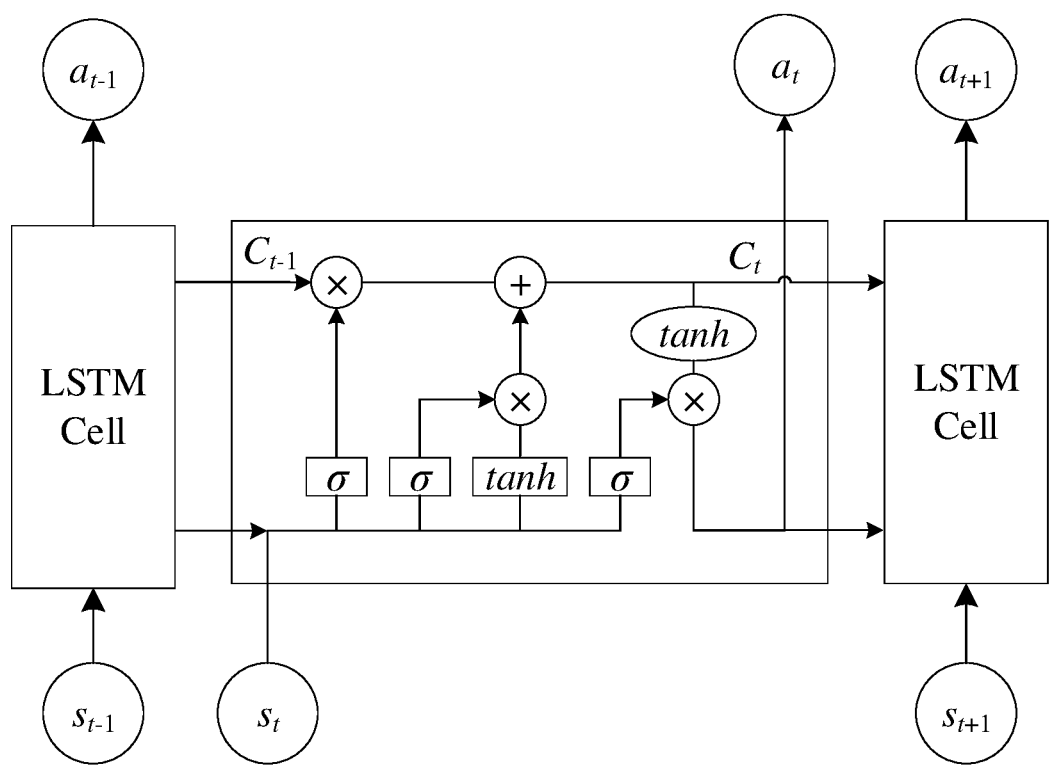
FIG. 4 is an LSTM network sequence calculation structure diagram provided by this disclosure.

S3: Integrating LSTM neural network and deep reinforcement learning principles to build a collision avoidance training model for a swarm of unmanned surface vehicles;

The collision avoidance problem of a swarm of unmanned surface vehicles in this disclosure is strongly time-dependent, it is a sequence of actions related to time before and after the collision avoidance action. In order to make the designed collision avoidance training model for a swarm of unmanned surface vehicles have the associated memory ability, LSTM (Long Short-Term Memory) neural network is introduced, the neural network structure is shown in FIG. 4.

Where the nodes in the LSTM network structure are replaced with nodes in the LSTM Cell structure, the input of the network is state s, and the output is action a, where in this embodiment:

The network structure of ActorNet is: 22*300*400*2;
The input is: 22=2+4*5, (own attributes (velocity and target distance)+4 fields*attribute of each field);
The output is: 2 (thrust and rudder angle);
The network structure of CriticNet is: (22*400+2)* 300*1;
The input is divided into two parts, namely: state 22, action 2;
First inputting the state into the hidden layer of the first layer with 400 nodes, and then using the output of the first layer together with the actions as the input of the hidden layer of the second layer with 300 nodes;
The output is the evaluation value: Q.

Figure 5:
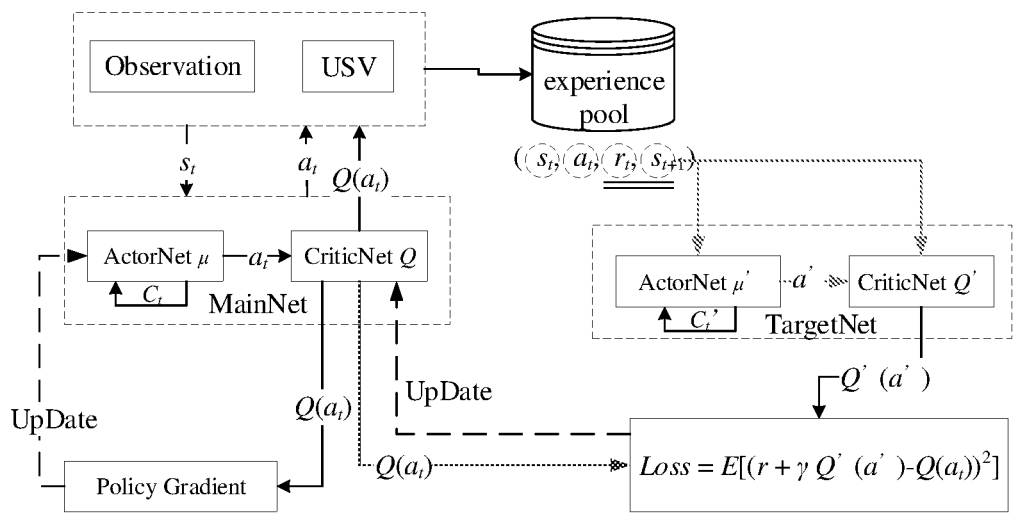
FIG. 5 is a framework diagram of an intelligent collision avoidance training model for a swarm of unmanned surface vehicles provided by this disclosure.

This embodiment is based on a DDPG (Deep Deterministic Policy Gradient) model and integrates LSTM to form the intelligent collision avoidance model for a swarm of unmanned surface vehicles in this embodiment. The improved DDPG model framework is shown in FIG. 5. There are two sets of Actor network and Critic network in the collision avoidance training model for a swarm of unmanned surface vehicles, called MainNet and TargetNet respectively. Among them, the Actor neural network outputs collision avoidance actions based on unmanned surface vehicle observation value. The model in this embodiment is an LSTM neural network with 20 layers of computing units to achieve the effect of remembering collision avoidance actions; The Critic Q neural network judges the perfection degree of this calculation according to the action and the result of the action, the two networks are calculated independently, and the Q neural network will calculate the gradient according to the evaluation result, and then update the weight parameters of the y decision neural network.

Figure 6:
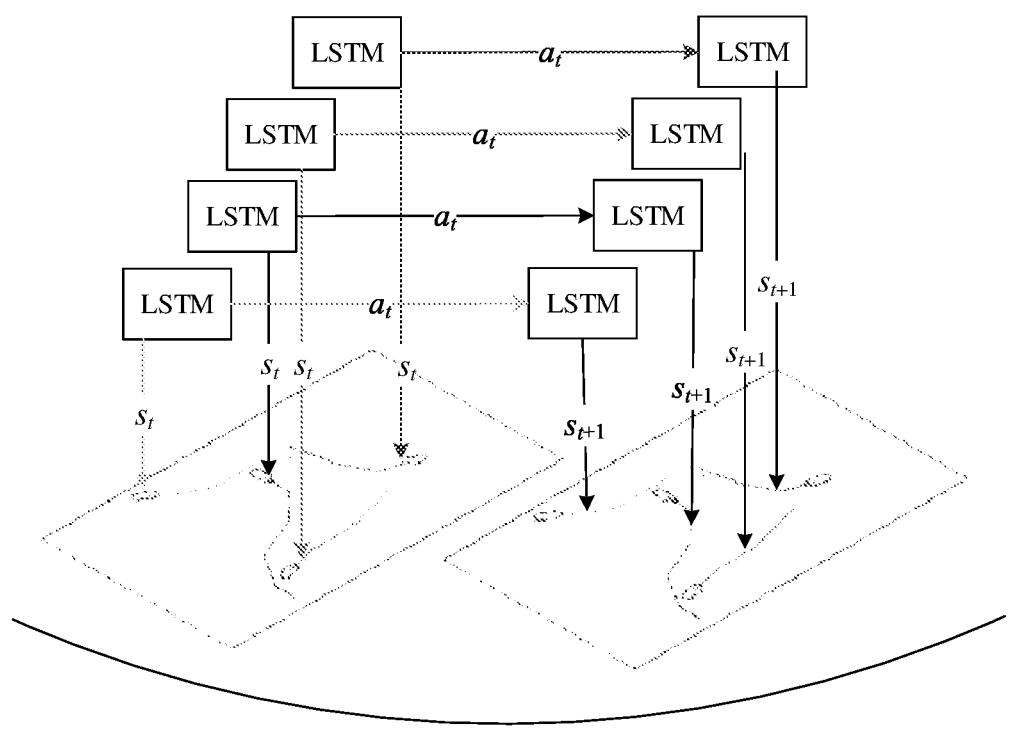
FIG. 6 is a schematic diagram of environment and model interactive training for collision avoidance of a swarm of unmanned surface vehicles provided by this disclosure.

As shown in FIG. 6, using the LSTM neural network in the Actor network of the reinforcement learning model can improve the collision avoidance action in the existing learning model to make the collision avoidance process smoother. USV collision avoidance actions are related in time series. The collision avoidance action at time t may affect the collision avoidance decision at time t+1. The LSTM network is used to identify the potential relevance of the actions before and after the collision avoidance process, so that the action generated by the model is more consistent.

S4: Training the USV to avoid collision in the environment with a swarm of unmanned surface vehicles based on the collision avoidance training model for a swarm of unmanned surface vehicles.

Figure 7:
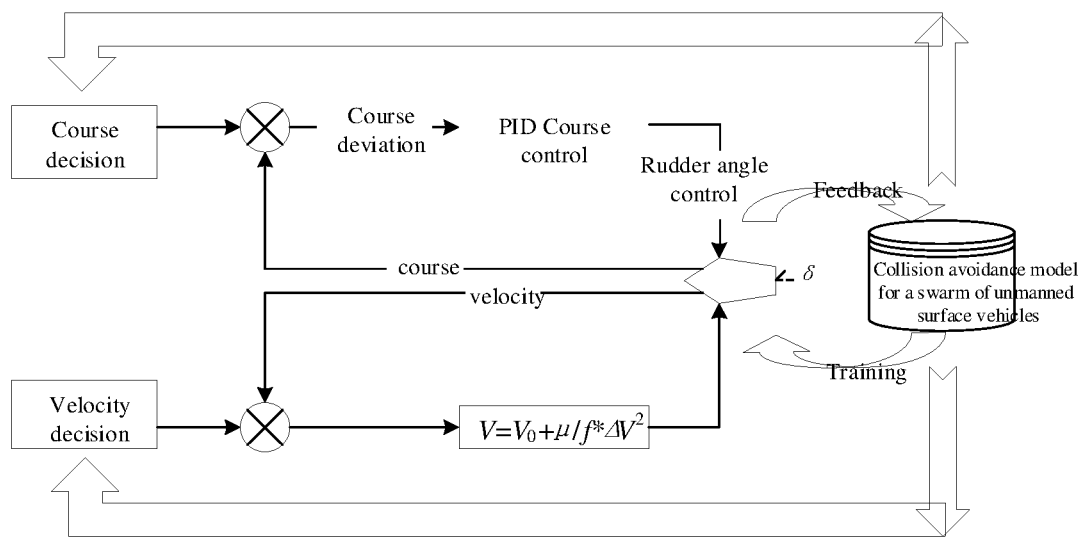
FIG. 7 is a training architecture diagram for the application of the collision avoidance model for a swarm of unmanned surface vehicles provided by this disclosure.

After constructing the collision avoidance model for a swarm of unmanned surface vehicles, it is necessary to build a simulation environment that can simulate the collision avoidance of a swarm of unmanned surface vehicles. Through the interaction between the simulation environment and the model, a large number of training samples are generated and the model network parameters are gradually updated, as shown in FIG. 7. Firstly, the simulation object in the simulation environment is the USV. The USV agent has a motion control system, after the USV receives the collision avoidance decision, it changes the rudder angle and velocity to complete a collision avoidance action, where $V_0$ represents the velocity before shifting, μ is the USV shifting velocity coefficient, f is the sampling frequency, and ΔV is the deviation between the current velocity and the target velocity; secondly, setting the obstacles in the simulation environment to be USVs, which are used to generate training samples, that is, each USV is determined by the model to avoid collisions, and the generated ($s_t$, $a_t$, $r_t$, $s_{t+1}$) will be stored in the experience pool of the model for neural network training parameters; finally, the USV will continue to interact and iterate with the training model in the simulation environment until all unmanned surface vehicles can safely drive past and clear to complete collision avoidance.

In the designed simulation environment, it is necessary to cooperate with the designed simulation scene to achieve the training effect. Therefore, in each simulation round of model training, the training process will randomly generate 10 USVs within a certain area; each USV will initialize random position, velocity and course, and its initial position is limited to the training interface, and the initial velocity is limited to the range of [2 kn, 30 kn], the initial course is limited to the range of [0°, 360°]. USV will encounter different complex encounter situations during navigation, training the collisions avoidance model for a swarm of unmanned surface vehicles under these conditions, and finally getting the model network parameters, which will be applied to USV collisions avoidance.

This disclosure provides an intelligent collision avoidance training method for a swarm of unmanned surface vehicles based on the principle of deep reinforcement learning, and collision avoidance training model for a swarm of unmanned surface vehicles is designed. The trained USV can effectively realize the collision avoidance of a swarm of unmanned surface vehicles. At the same time, under the condition that the training effect is good, the environmental observation value and reward and punishment function designed by this disclosure can be used to train the neural network in the model, and guide the USV to safely avoid collisions in a variety of collision avoidance environments with a swarm of unmanned surface vehicles, it has a certain degree of adaptability to different encounter situations.

It is to be understood, however, that even though numerous characteristics and advantages of this disclosure have been set forth in the foregoing description, the disclosure is illustrative only, and changes may be made in detail, especially in matters of shape, size, and arrangement of parts within the principles of this disclosure to the full extent indicated by the broad general meaning of the terms in which the appended claims are expressed.

What is claimed is:

1. A collision avoidance method for a swarm of unmanned surface vehicles based on deep reinforcement learning, comprising:

S1: establishing a vehicle coordinate system, and designing an unmanned surface vehicle (USV) motion model based on the vehicle coordinate system, wherein the USV motion model is used to reflect a motion state of a USV;

S2: based on the USV motion model, expressing environmental features in the vehicle coordinate system as environmental observation values of a fixed dimension, and designing a reward and punishment function of collision avoidance effect based on the environmental observation values, wherein the reward and punishment function of collision avoidance effect is used to judge a perfection degree of a collision avoidance decision of the USV;

wherein based on the USV motion model, the expressing environmental features in the vehicle coordinate system as environmental observation values of a fixed dimension comprises:

according to international regulations for preventing collisions at sea (COLREGS), dividing n number of fields based on a vehicle-side angle of a $USV_j$ as an obstacle, and obtaining a USV environmental observation value of each of the n number of fields, wherein the USV environmental observation value of each of the n number of fields comprises the vehicle-side angle, swarm movement characteristics, movement trends and danger degrees;

combining the USV environmental observation value in each of the n number of fields to form a four-dimensional matrix, and adding weights to the four-dimensional matrix corresponding to each of the n number of fields to obtain a final USV environmental observation value;

wherein the USV environmental observation value in each of the n number of fields is obtained through $$\begin{cases} \Delta\theta = \theta_{max} - \theta_{min} \\ \overline{C} = \frac{1}{n}\sum_{i=1}^{n} C_j \\ CRI' = \prod_{j=1}^{n} CRI_j \\ \overline{d} = \sum_{i=1}^{n} d_j/n \\ V_x = \sum_{j=1}^{n} V_{j\_x} \\ V_y = \sum_{j=1}^{n} V_{j\_y} \end{cases},$$

where $\theta_{max}$ and $\theta_{min}$ respectively represent a maximum vehicle-side angle and a minimum vehicle-side angle of the obstacle in each of the n fields; $C_j$ represents a movement direction of the $USV_j$ as the obstacle; $CRI_j$ represents a danger degree of the $USV_j$; $d_j$ represents a distance between a $USV_j$ and the $USV_j$ as the obstacle, $V_{jx}$ and $V_{jy}$ respectively represent a x horizontal component and a y vertical component of a velocity of the $USV_j$ as the obstacle;

wherein the four-dimensional matrix of each of the n fields is formed by $S_u=[\Delta\theta\ \overline{C}\ CRI'\ \overline{d}\ V_x\ V_y]$, where u=(1, 2, . . . , n), and the final USV environmental observation value is formed by $s_t=[V_i\ C_i\ \chi_1 S_1\ \chi_2 S_2\ \chi_3 S_3 \ldots \chi_n S_n]^T$, where $\chi_1, \chi_2, \chi_3, \ldots, \chi_n$ are the weights corresponding to the n fields respectively;

wherein the reward and punishment function is designed by $$R_{danger} = \sum_{i=1}^{n} \ln\left(\frac{DCPA_i}{D_s}\right)^2 + k_{CRI} \times \sum_{u=1}^{4} CRI'_{t-1} - CRI'_t$$

$$R_{rule} = \exp\left(-\frac{a_t(V)}{D_{LMA}} \times \sum_{u=1}^{4} \sqrt{(\overline{d}_t - \overline{d}_{t-1})^2} - (V_0 - V_s)^2 + a_t(V)\right)$$

$$R_{action} = 1/1 + \exp(-k_{action}\delta_t \times (a_t(C) - a_{t-1}(C)))$$

$$r_t = R_{danger} + R_{rule} + R_{action},$$

where $CRI_t'$ represents a danger degree of field at time t, $\overline{d}_t$ represents an average distance of the obstacle of field at time t, $a_t(C)$ represents a course change in a decision set, $a_t(V)$ represents a velocity change of the decision set, $R_{danger}$ represents a changing trend of the danger degree considering reward and punishment calculations of encounter situation, $R_{rule}$ represents a deviation between a current decision and the COLREGS and the deviation is a punitive negative value when the COLREGS is violated, $R_{action}$ represents a continuity of decision-making actions and calculates an impact of decision-making shock in collision avoidance, $r_t$ represents a reward and punishment value formed by combining the factors $R_{danger}$, $R_{rule}$ and $R_{action}$; $DCPA_i$ represents a minimum encounter distance between the USV and the $USV_i$, $D_s$ represents a safe distance between the USV and the $USV_i$ to avoid collision, $k_{CRI}$ represents an impact coefficient of collision risk, $D_{LMA}$ represents a shortest distance between the USV and the $USV_i$ to avoid collision when one USV implements full rudder rotation to avoid collision and the other USV is going straight, $V_0$ represents an initial velocity of the USV, $V_s$ represents a safe velocity of the USV calculated considering an influence of USV velocity, a safety distance between vehicles and a navigation environment, $k_{action}$ represents a coefficient of action influence, and $\delta_t$ represents a rudder angle of the USV;

S3: integrating a long short-term memory (LSTM) neural network and deep reinforcement learning principles to build a collision avoidance training model for the swarm of USVs; and S4: training the USV to avoid collision in an environment with the swarm of USVs based on the collision avoidance training model for the swarm of USVs.

2. The collision avoidance method according to claim 1, where in the step S1, the establishing a vehicle coordinate system comprises:

converting surrounding USVs to the attribute representation in the vehicle coordinate system by $$\begin{cases} [X_j \; Y_j] = [P_{x\_j} - P_{x\_i} \;\; P_{y\_j} - P_{y\_i}] \begin{bmatrix} \cos C_i & \sin C_i \\ -\sin C_i & \cos C_i \end{bmatrix} \\ c_j = C_j - C_i \\ v_j = V_j - V_i \\ \psi_j = \delta_j \\ \theta_j = \arctan(Y_j / X_j) \end{cases},$$

where $(X_j, Y_j)$ represents a position of the $USV_j$ in the vehicle coordinate system, $(P_{x\_i}, P_{y\_i})$ represents a position of the $USV_i$ in a global coordinate system, $C_i$ represents a course of the $USV_i$ in the global coordinate system, $V_i$ represents a velocity of the $USV_i$ in the global coordinate system, $c_j$ represents a course of the $USV_j$ in the vehicle coordinate system, $v_j$ represents the velocity of the $USV_j$ in the vehicle coordinate system, $\theta_j$ represents a vehicle-side angle of the $USV_j$ in the vehicle coordinate system, $\psi_j$ represents a rudder angle of the $USV_j$ in the vehicle coordinate system, $(P_{x\_j}, P_{y\_j})$ represents a position of the $USV_j$ in the global coordinate system, $C_j$ represents a course of the $USV_j$ in the global coordinate system, $V_j$ represents a velocity of the $USV_j$ in the global coordinate system, $\delta_j$ represents a rudder angle of the $USV_j$ in the global coordinate system, the subscripts i and j are used to distinguish different USVs.

3. The collision avoidance method according to claim 2, wherein the designing a USV motion model based on the vehicle coordinate system comprises:

using a Nomoto equation as a USV motion equation in a motion simulation, and embedding a proportional-integral-derivative (PID) to simulate an autonomous course control to constitute the USV motion model, and making the USV be capable of adjusting a course by controlling a rudder angle.

4. The collision avoidance method according to claim 3, wherein the autonomous course control is simulated by $$E_k = C_{target} - C_k$$

$$\Delta u(k) = (K_p + K_i*1/f + K_d*f)E_k - (K_p + 2K_d*f*E_{k-1} + K_d*f*E_{k-2})$$

$$\delta_k = \delta_{k-1} + \Delta u(k)$$

where k represents an action to execute a kth decision, $E_k$ represents a kth course deviation value, $C_{target}$ represents a target course, $C_k$ represents a kth course angle, $\delta_k$ and $\delta_{k-1}$ represent rudder angles after a kth execution and a k−1th execution respectively, $K_p$ represents a proportional coefficient, $K_i$ represents an integral coefficient, $K_d$ represents a differential coefficient, f represents a scanning frequency, $\Delta u(k)$ represents a kth rudder angle increment, $E_{k-1}$ represents a k−1th course angle, $E_{k-2}$ represents a k−2th course angle.

5. The collision avoidance method according to claim 1, wherein the step S3 comprises:

building the collision avoidance training model for the swarm of USVs by MainNet and TargetNet, wherein each of the MainNet and the TargetNet comprises an Actor neural network and a Critic Q neural network;

wherein the Actor neural network outputs collision avoidance actions based on the USV environmental observation value, the Actor neural network is the LSTM neural network with a plurality of layers of computing units to achieve an effect of remembering the collision avoidance actions;

wherein the Critic Q neural network judges the perfection degree of the reward and punishment calculations according to the collision avoidance actions and results of the collision avoidance actions, thereby obtaining an evaluation result;

wherein the Actor neural network and the Critic Q neural network are calculated independently, the Q neural network is capable of calculating a gradient according to the evaluation result, and then updating neural network weight parameters.

6. The collision avoidance method according to claim 5, wherein step the S4 comprises:

building a simulation environment, wherein a simulation object in the simulation environment is the USV, after the USV receives the collision avoidance decision, changing the rudder angle and the velocity to complete one collision avoidance action;

setting obstacles in the simulation environment to be USVs to generate training samples, wherein each of the USVs is determined by the collision avoidance training model for the swarm of USVs, a generated ($s_t$, $a_t$, $r_t$, $s_{t=1}$) is stored in an experience pool of the collision avoidance training model for neural network training parameters, and the subscripts t and t+1 represent time;

wherein the USV continues to interact and iterate with the collision avoidance training model in the simulation environment until all USVs safely drive past and clear to complete the collision avoidance.

* * * * *